US007674403B2

(12) United States Patent
Kim

(10) Patent No.: US 7,674,403 B2
(45) Date of Patent: Mar. 9, 2010

(54) COMPOSITION, AN ELECTRODE TRANSFER FILM INCLUDING THE SAME, A DISPLAY PANEL, AND A METHOD OF FORMING AN ELECTRODE

(75) Inventor: Chul-Hong Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 655 days.

(21) Appl. No.: 11/492,800

(22) Filed: Jul. 26, 2006

(65) Prior Publication Data

US 2007/0024193 A1 Feb. 1, 2007

(30) Foreign Application Priority Data

Jul. 29, 2005 (KR) ...................... 10-2005-0069457

(51) Int. Cl.
*H01B 1/22* (2006.01)
*B32B 5/16* (2006.01)
*B05D 5/12* (2006.01)

(52) U.S. Cl. ....................... 252/512; 252/514; 428/207; 428/403; 427/96.1

(58) Field of Classification Search ......... 252/512–514; 428/403, 207; 430/270.1; 313/311, 504; 427/96

See application file for complete search history.

(56) References Cited

U.S. PATENT DOCUMENTS

| | | | | |
|---|---|---|---|---|
| 3,904,405 | A * | 9/1975 | Russell et al. | 419/11 |
| 4,652,465 | A * | 3/1987 | Koto et al. | 427/216 |
| 4,836,955 | A * | 6/1989 | Ehrreich | 252/512 |
| 4,888,135 | A * | 12/1989 | Tsunaga et al. | 252/512 |
| 5,492,863 | A * | 2/1996 | Higgins, III | 438/610 |
| 6,156,433 | A | 12/2000 | Hatori et al. | |
| 7,442,488 | B2 * | 10/2008 | Lee et al. | 430/270.1 |
| 2001/0031372 | A1 * | 10/2001 | Ostolski | 428/570 |
| 2002/0034611 | A1 | 3/2002 | Masuko et al. | |
| 2004/0232840 | A1 * | 11/2004 | Aoki et al. | 313/582 |
| 2006/0071202 | A1 * | 4/2006 | Lee et al. | 252/514 |

FOREIGN PATENT DOCUMENTS

| | | | |
|---|---|---|---|
| JP | 591431149 | * | 8/1984 |
| JP | 10-116558 | | 5/1998 |
| JP | 11-096918 | | 4/1999 |
| JP | 11-260250 | | 9/1999 |
| KR | 1999-0045194 | A | 6/1999 |
| KR | 2005053040 | * | 6/2005 |
| KR | 10-2006-00110630 | A | 10/2006 |

* cited by examiner

*Primary Examiner*—Mark Kopec
(74) *Attorney, Agent, or Firm*—Lee & Morse, P.C.

(57) ABSTRACT

A composition for forming an electrode including a conductive composite of a first material coated with a metal that has a higher electrical conductivity, wherein the first material is at least one selected from the group consisting essentially of nickel, carbon, and copper.

15 Claims, 6 Drawing Sheets

COMPOSITION, AN ELECTRODE TRANSFER FILM INCLUDING THE SAME, A DISPLAY PANEL, AND A METHOD OF FORMING AN ELECTRODE

BACKGROUND OF THE INVENTION

1. Field of the Invention

The present invention relates to a composition, an electrode transfer film having the same, and a display panel having the same. More particularly, the present invention relates to a composition and an electrode transfer film that are suitable for fabricating finely patterned electrodes of a high definition display panel, and a display panel including the electrodes.

2. Description of the Related Art

Various types of display panels use electrodes to control the display of images. For example, a plasma display panel (PDP) is a flat panel display device that includes a plurality of electrodes to control image formation. The PDP uses a plasma or gas discharge phenomenon, wherein a discharge is generated in the panel by applying a voltage potential to electrodes that are separated from each other in a gas atmosphere.

A plasma display panel generally includes electrodes such as address electrodes and display electrodes. One or more of these may be formed of, e.g., a transparent electrode and a bus electrode. In some cases, the address electrode may be patterned and may be formed using a silver paste by a printing method, and the sustain electrodes may include the transparent electrode and the bus electrode. The transparent electrode may be formed by vacuum deposition of a transparent electrode material, e.g., indium tin oxide (ITO), and the bus electrode may be formed by vacuum deposition of chromium, copper and chromium, in sequence, and then etching them in a pattern.

Where the printing method for forming the address electrode uses a paste, it may be difficult to accurately regulate the pitch and width of the electrode. In addition, the vacuum deposition and etching processes for forming the bus electrode may require significant processing time and incur high material costs.

Efforts to produce simple and economically attractive processes for forming electrodes with fine, accurately-controlled line widths have focused on a photosensitive paste method (or a thick layer photosensitive method), wherein a photosensitive composition including an electrode material is prepared, applied and patterned. The photosensitive paste method may include forming a layer on a substrate by printing a paste including photosensitive inorganic particles, forming a pattern on the substrate by projecting ultraviolet (UV) light through a photomask onto the layer, and the firing the patterned layer. This photosensitive paste method may be particularly suited to the manufacture of PDPs, which are continually being refined to have larger areas and greater resolutions. Although the photosensitive paste method may be used, it is limited to silver (Ag).

Silver generally has excellent electrical characteristics. However, its use for the manufacture of electrodes may result in high cost. Further, the patterning of silver-based electrodes may be somewhat unsatisfactory because silver oxide and/or silver sulfide may be generated due to the reaction of the silver electrode with external contaminants such as moisture or impurities formed on the surface of the electrode. In addition, silver-based electrodes may exhibit a relatively short life span and deteriorating electrical characteristics because the electrode may be corroded and undergo color changes.

SUMMARY OF THE INVENTION

The present invention is therefore directed to a composition, an electrode transfer film including the same, a display panel, and a method of forming an electrode, which substantially overcome one or more of the problems due to the limitations and disadvantages of the related art.

It is therefore a feature of an embodiment of the present invention to provide a composition, and an electrode transfer film including the composition, that can be substituted for silver and is suitable for a photosensitive exposure process.

It is therefore another feature of an embodiment of the present invention to provide a method of fabricating an electrode using the electrode transfer film, and a plasma display panel including the electrode.

At least one of the above and other features and advantages of the present invention may be realized by providing a composition including a conductive composite of a first material coated with a metal that has a higher electrical conductivity, wherein the first material is at least one selected from the group consisting essentially of nickel, carbon, and copper.

The metal having a higher electrical conductivity may be at least one selected from the group consisting essentially of aluminum (Al), chromium (Cr), copper (Cu), rhodium (Rh), palladium (Pd), silver (Ag), platinum (Pt), gold (Au), a platinum-rhodium alloy (Pt—Rh), and a silver-palladium alloy (Ag—Pd).

The composition may be photosensitive and may further include about 10 to about 20 parts by weight of a binder resin, about 1 to about 3 parts by weight of a cross-linking agent, about 0.1 to about 1.5 parts by weight of a photoinitiator, and about 4 to about 30 parts by weight of a solvent, wherein the conductive composite is present in an amount of about 20 to about 80 parts by weight, based on the weight of the composition.

The conductive composite may be a powder. The conductive composite may have an average diameter in a range of about 0.06 μm to about 20 μm. The first material may have an average diameter in a range of about 0.01 μm to about 10 μm. The first material may have an average diameter in a range of about 0.05 μm to about 5 μm. The coating of the metal having a higher electrical conductivity on the first material may have a thickness in a range of about 0.05 μm to about 10 μm.

At least one of the above and other features and advantages of the present invention may also be realized by providing a transfer film for forming an electrode including a substrate film, and a transfer layer on the substrate film, the transfer layer including at least one conductive layer, wherein the conductive layer may include a conductive composite of a first material coated with a metal that has a higher electrical conductivity, the first material being at least one selected from the group consisting essentially of nickel, carbon, and copper.

The transfer film may further include a protective film on the transfer layer, opposite the substrate film. The metal having a higher electrical conductivity may be at least one selected from the group consisting essentially of aluminum (Al), chromium (Cr), copper (Cu), rhodium (Rh), palladium (Pd), silver (Ag), platinum (Pt), and gold (Au). The transfer layer may further include a black layer adjacent to the conductive layer. The black layer may include a black pigment including a metal oxide or a composite metal oxide, which includes at least one metal selected from the group consisting of gold, silver, copper, palladium, platinum, aluminum, nickel, and an alloy thereof, and one or two selected from the group consisting of cobalt, copper, chromium, manganese, and aluminum.

At least one of the above and other features and advantages of the present invention may further be realized by providing a method of forming an electrode including providing a transfer film, transferring the transfer film to a substrate, and firing the transfer film, wherein the transfer film may include a substrate film, a transfer layer on the substrate film, the transfer layer including at least one conductive layer, and a protective film on the transfer layer, wherein the at least one conductive layer may include a conductive composite of a first material coated with a metal that has a higher electrical conductivity, the first material being at least one selected from the group consisting essentially of nickel, carbon, and copper.

The metal having a higher electrical conductivity may be at least one selected from the group consisting essentially of aluminum (Al), chromium (Cr), copper (Cu), rhodium (Rh), palladium (Pd), silver (Ag), platinum (Pt), and gold (Au). The firing may be performed at a temperature of about 300° C. to about 600° C. The transferring may be performed using a sheet method, a photosensitive taping method, or a material transferring method.

At least one of the above and other features and advantages of the present invention may still further be realized by providing a display panel including front and rear substrates disposed to face each other, and a first electrode and a second electrode spaced apart from each other and disposed between the front and rear substrates, wherein at least one of the first and second electrodes may be formed from a conductive composite of a first material coated with a metal that has a higher electrical conductivity, and wherein the first material may be at least one selected from the group consisting essentially of nickel, carbon, and copper.

The metal having a higher electrical conductivity may be at least one selected from the group consisting essentially of aluminum (Al), chromium (Cr), copper (Cu), rhodium (Rh), palladium (Pd), silver (Ag), platinum (Pt), and gold (Au). The at least one of the first and second electrodes may include a transparent electrode and a bus electrode, and the bus electrode is formed from the conductive composite.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
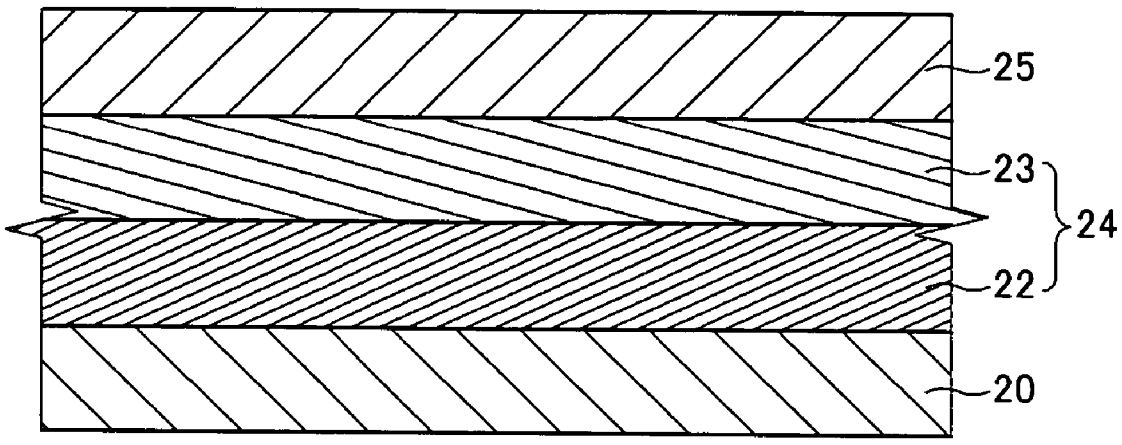
FIG. 1 illustrates a cross-sectional view of an electrode transfer film according to an embodiment of the present invention.

Korean Patent Application No. 10-2005-0069457, filed on Jul. 29, 2005, in the Korean Intellectual Property Office, and entitled: "Photosensitive Composition for Forming an Electrode Transfer Film and an Electrode, and a Plasma Display Panel Comprising the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. It will also be understood that the term "phosphor" is intended to generally refer to a material that can generate visible light upon excitation by ultraviolet light that impinges thereon, and is not intended be limited to materials the undergo light emission through any particular mechanism or over any particular time frame. Like reference numerals refer to like elements throughout.

The present invention may provide an electrode having electrical characteristics that are superior to a conventional silver electrode. In particular, a composition for forming an electrode may be used to fabricate a transfer film, which, in turn, may be used to fabricate the electrode. The composition may include a conductive composite formed by coating a first material, e.g., nickel, carbon and/or copper, with a metal that has a higher electrical conductivity. Thus, the electrode may use nickel, carbon and/or copper as an electrode material rather than silver, as conventionally used.

Conductive Composite

The conductive composite may be formed by coating one or more of nickel, carbon and/or copper with a metal having a higher electrical conductivity. Nickel, carbon and copper are relatively less expensive than the conventional silver material, and may be fired at a lower temperature than silver, which is conventionally fired at a temperature of 550° C. to fabricate an electrode. Coating the nickel, carbon and/or copper with a metal having a higher electrical conductivity may offset the relatively low electrical conductivity of these materials, and also reduce or prevent their corrosion by air.

The metal having a higher electrical conductivity may include, e.g., aluminum (Al), chromium (Cr), copper (Cu), rhodium (Rh), palladium (Pd), silver (Ag), platinum (Pt), and gold (Au), a platinum-rhodium alloy (Pt—Rh), a silver-palladium alloy (Ag—Pd), etc.

The nickel, carbon and/or copper may be coated with the metal through a number of suitable processes, e.g., vacuum deposition, sputtering, plasma deposition, ion-plating, etc.

The conductive composite formed by coating a material such as nickel, carbon and/or copper with the metal may provide advantages of low cost and low firing temperature, and may simultaneously provide the high electrical conductivity of the metal coated on the outside thereof.

The conductive composite may be in a powder form, e.g., granules, spheres, flakes, etc. The conductive composite may have an average diameter in a range of about 0.06 μm to about 20 μm. The nickel, carbon and/or copper in the conductive composite may have an average diameter in a range of about 0.01 μm to about 10 μm, e.g., about 0.05 μm to about 5 μm. The metal coating may have a thickness in a range of about 0.05 μm to about 10 μm.

Composition for Forming an Electrode

The conductive composite described above may be used as an electrode material. For example, the conductive composite may be provided in a thermally sensitive or photosensitive composition, and the composition may be used for fabricating a transfer film, which may be used to form an electrode.

The photosensitive composition may include, e.g., a binder resin, a cross-linking agent, a dispersing agent and a solvent, as well as the conductive composite in a predetermined amount.

In particular, the conductive composite may be included in an amount ranging from about 20 to about 80 parts by weight, based on the entire amount of the photosensitive composition. Providing less than about 20 parts by weight of the conductive composite may yield an electrode with low conductivity. Providing more than about 80 parts by weight of the conductive composite may yield an electrode that forms a short circuit and a non-uniform surface during the firing, due to poor dispersion in the solvent.

The binder resin may include, e.g., an acryl-based resin, a styrene resin, a novolac resin, a polyester resin, etc., as are commonly used for preparing photoresists. The binder resin may have a number average molecular weight (Mn) ranging from about 5,000 to about 50,000, so that it can be easily removed during a developing process.

The binder resin may be included in an amount ranging from about 10 to about 20 parts by weight, based on the entire amount of the photosensitive composition. Providing less than about 10 parts by weight may make it difficult for a transfer film to maintain its shape. Providing more than about 20 parts by weight may result in an electrode that contains undesired residues.

The cross-linking agent may include any one of a variety of compounds that are suitable for a radical polymerization reaction, e.g., multifunctional monomers such as ethylene glycol diacrylate, ethylene glycol dimethacrylate, trimethylolpropane triacrylate, trimethylol propane trimethacrylate, tetramethylol, propane tetraacrylate, tetramethylolpropane tetramethacrylate, combinations thereof, etc.

The cross-linking agent may be provided in a predetermined proportion based on the amount of binder resin. The cross-linking agent may be present in an amount ranging from about 20 to about 30 parts by weight, based on 100 parts by weight of the binder resin, which corresponds to about 1 to about 3 parts by weight based on the entire amount of the photosensitive composition. Providing less than about 1 parts by weight may yield an electrode having a pattern of pinholes. Providing more than about 3 parts by weight may yield an electrode without a smooth and uniform pattern after the developing process, and which may contain residues after the firing.

The photoinitiator may include one or more of a number of compounds that are suitable for generating radicals during the UV light exposure process and that initiate a cross-linking reaction by the cross-linking agent. Examples of the photoinitiator may include, e.g., methyl o-benzoylbenzoate, 4,4-bis(dimethylamine)benzophenone, 2,2-diethoxyacetophenone, 2,2-dimethoxy-2-phenyl-2-phenylacetophenone, 2-methyl-[4-(methylthio)phenyl]-2-morpholinopropa-1-one, 2-benzyl-2-dimethylamino-1-(4-morpholinophenyl)-1-butanone, bis(2,6-dimethoxybenzoyl)-2,4,4-trimethylpentylphosphineoxide, combinations thereof, etc.

The photoinitiator may be provided in a predetermined proportion based on the amount of the cross-linking agent. The photoinitiator may be provided in an amount of about 10 to about 50 parts by weight, based on 100 parts by weight of the cross-linking agent, which corresponds to about 0.1 to about 1.5 parts by weight, based on 100 parts by weight of the total photosensitive composition.

The solvent may be, e.g., an organic solvent, and may be any of a number of solvents capable of dispersing the above-described components. Suitable organic solvents may include, e.g., ketones such as diethylketone, methylbutylketone, dipropylketone, cyclohexanone, etc., alcohols such as n-pentenol, 4-methyl-2-pentenol, cyclohexanol, diacetonealcohol, etc., ether-based alcohols such as ethylene glycol monomethylether, ethylene glycol monoethylether, ethylene glycol monobutylether, propylene glycol monomethylether, propylene glycol monoethylether, etc., saturated aliphatic alkyl monocarboxylate esters such as n-butyl acetate, amyl acetate, etc., lactate esters such as ethyl lactate, n-butyl lactate, etc., ether-based esters such as methyl cellosolve acetate, ethyl cellosolve acetate, propylene glycol monomethylether-acetate, ethyl-3-ethoxypropionate, etc. The organic solvents may be used alone or in combination.

The solvent may be used in an amount of about 4 to about 30 parts by weight, based the total weight of the composition, to obtain a composition suitable for forming a transfer film having a viscosity of about 7,000 to about 50,000 cps. In an implementation, the viscosity may be about 10,000 to about 30,000 cps.

The photosensitive composition may further include, e.g., a sensitizer for improving sensitivity, a polymerization inhibitor for improving storage stability of a coating composition, e.g., phosphoric acid, phosphoric acid ester, a carboxylic acid-containing compound, etc., an oxidation inhibitor, a UV light absorber for improving resolution, an antifoaming agent for reducing pores in the composition, e.g., a silicone-based or acryl-based compound, a dispersing agent for improving dispersion properties, a leveling agent for improving flatness of a printed layer, e.g., polyester modified dimethylpolysiloxane, polyhydroxycarboxylic acid amide, a silicone-based polyacrylate copolymer or a fluoro-based paraffin compound, and/or a plasticizer for introducing thixotropic characteristics.

The photosensitive composition may be made by using, e.g., a roll-kneader, a mixer, a homo mixer, a ball mill, a bead mill, etc.

Transfer Film

The composition described above may be implemented as a photosensitive composition and formed into a transfer film for forming an electrode.

FIG. 1 illustrates a cross-sectional view of an electrode transfer film according to an embodiment of the present invention. Referring to FIG. 1, the transfer film may include a substrate film 20, a transfer layer 24 including a conductive layer 23 and a black layer 22, and a protection film 25 for protecting the transfer layer 24. The black layer 22 may be particularly adapted to improve contrast and may be disposed between the conductive layer 23 and the substrate 20.

The conductive layer 23 may be formed of a photosensitive composition that includes a conductive composite formed by coating one or more of nickel, carbon and/or copper with a metal having a higher electrical conductivity, as described above.

The black layer 22 may include, e.g., a conductive metal and/or a black pigment. The conductive metal may be, e.g., aluminum (Al), nickel (Ni), copper (Cu), palladium (Pd), silver (Ag), platinum (Pt), gold (Au), alloys thereof, etc. The black pigment may include, e.g., a metal oxide or a composite metal oxide formed from aluminum (Al), chromium (Cr), manganese (Mn), iron (Fe), cobalt (Co) and/or copper (Cu).

The conductive layer 23 and the black layer 22 may each have a thickness ranging from about 0.05 μm to about 10 μm. A thickness of less than about 0.05 μm may cause the electrode including the conducting layer and the black layer to not work well. A thickness of more than about 10 μm may result in a transfer film that is too thick to perform a transfer process.

The substrate film 20 and the protection film 25 may be made of the same or different materials, and may be formed from, e.g., polyvinyl alcohol, polyvinyl formals, polyvinyl acetals, olefins such as ethylene and propylene, acrylic acid, unsaturated carboxylic acids such as methacrylic acids, crotonic acids, etc., cellulose acetate butylene, polycarbonate, poly(vinylchloride), polystyrene, poly(methylmethacrylate), polyethylene, poly(ethylene terephthalate), etc.

The transfer film may be fabricated according to the following method: a) a first coating layer may be formed by coating and drying a photosensitive composition for the black layer on a substrate film; b) a second coating layer may be formed by coating and drying the photosensitive material for the conductive layer on the first coating layer; and c) a protection film may be laminated on the second coating layer.

The photosensitive composition for a black layer may be prepared by, e.g., mixing and dissolving a glass frit, a binder, a cross-linking agent and a photoinitiator with the conductive metal and/or the black pigment, and, in other aspects, may be similar to the above-described photosensitive composition including the conductive composite.

The coating method used for the first and second coating layers may include, e.g., a typical wet coating method. The wet coating may be performed with various coating tools, e.g., a roll-coater, a blade, a slit-coater, a curtain-coater, a wire coater, etc. The drying process for the transfer film may be at a temperature of about 50° C. to about 150° C., depending on the solvent used in the previous stage. A drying time may be, e.g., about 0.5 minutes to about 30 minutes.

Fabrication of an Electrode

The transfer film according to the present invention may be used to form an electrode through patterning with, e.g., a sheet method, a photosensitive tape process, or a material transferring method. These transferring methods may be easy to perform and may be suitable for manufacturing large panels.

Figure 2:
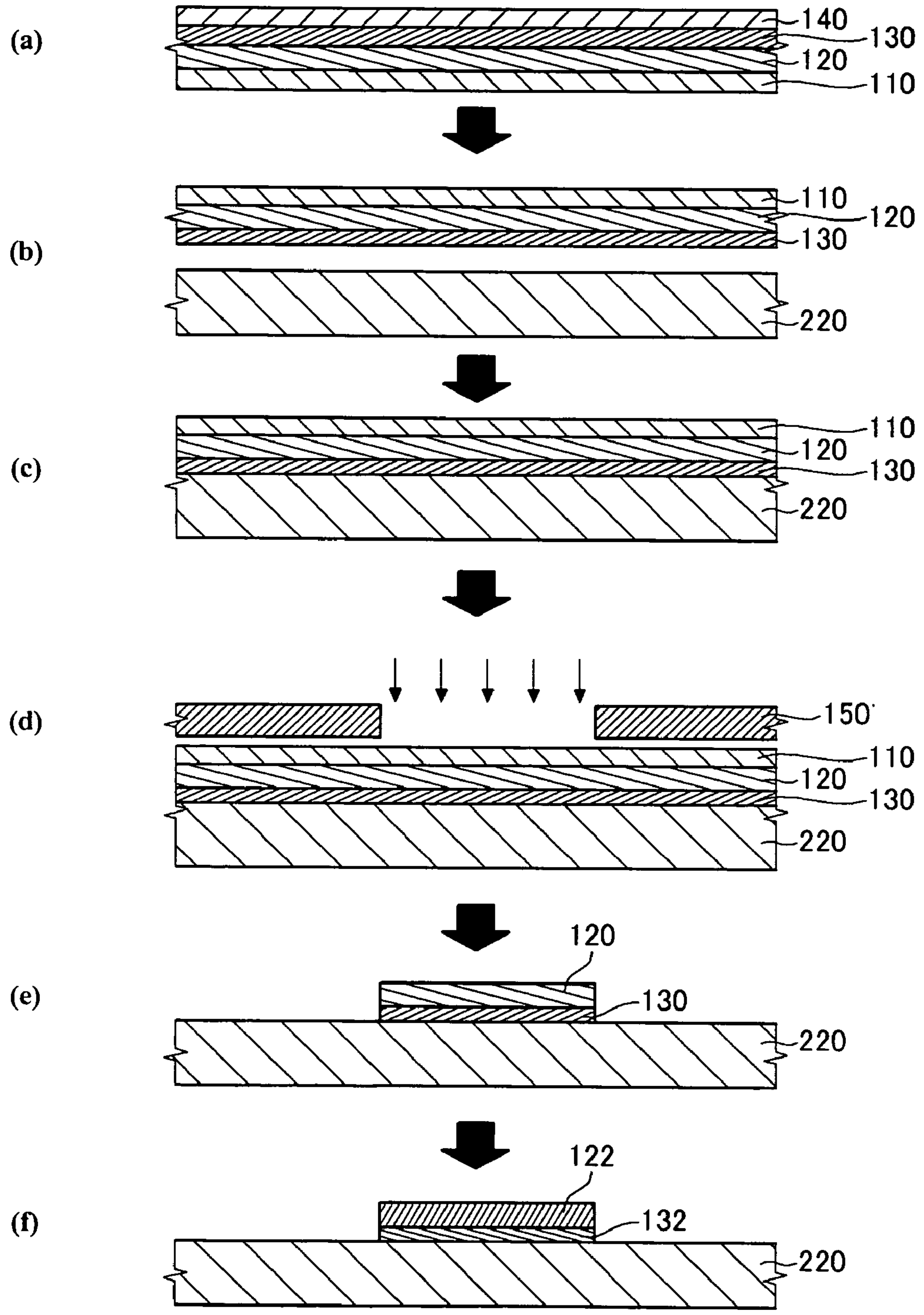
FIG. 2 illustrates stages in a method of fabricating an electrode using a sheet method according to an embodiment of the present invention.

FIG. 2 illustrates stages in a method of fabricating an electrode using a sheet method according to an embodiment of the present invention. Referring to (a) in FIG. 2, a transfer film may be formed by interposing a black layer 130 and a transfer layer 120 between a substrate film 110 and a protection film 140.

Referring to (b) and (c) in FIG. 2, after the protection film 140 of the transfer film is removed, the black layer 130 under the protection film 140 may be turned down to face a substrate 220, upon which an electrode is to be formed.

Referring to (d) and (e) in FIG. 2, the black layer 130 and the transfer layer 120 in the transfer film, which face the substrate, may be formed in a predetermined pattern through a photolithography process. For example, a photomask 150 may be separately placed on the substrate film 110 (optional), after which UV light exposure may be used to project UV light through the photomask 150 in order to cross-link binder resins in the photosensitive composition that forms the black layer 130 and the photosensitive composition including the conductive composite that forms the conductive layer 120. After UV light exposure, the exposed layers may then be developed using a developing solution. In an implementation, unexposed parts of the black layer 130 and the transfer layer 120, as well as the substrate film 110, may be removed.

Referring to (f) in FIG. 2, the patterned black layer 130 and transfer layer 120 may be fired at about 300° C. to about 600° C., yielding an electrode with two layers, i.e., a black layer 132 and a transfer layer 122.

According to an embodiment of the present invention, the conductive layer 122 includes the conductive composite formed by coating nickel, carbon and/or copper with a metal having a higher electrical conductivity. Thus, as compared to the conventional method of forming electrodes that uses silver, it can thereby lower the firing temperature from 500 to 700° C. to about 300° C. to about 600° C. In addition, since the present invention does not require a particular non-oxidizing atmosphere, it may be advantageous as a simpler process with lower costs.

Figure 3:
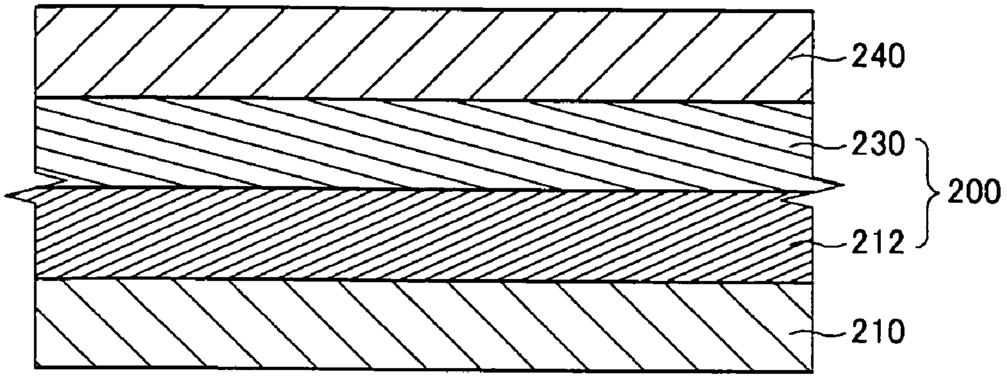
FIG. 3 illustrates a cross-sectional view of an electrode transfer film fabricated in a photosensitive taping method according to an embodiment of the present invention.

FIG. 3 illustrates a cross-sectional view of an electrode transfer film fabricated in a photosensitive taping method according to an embodiment of the present invention. Referring to FIG. 3, the transfer film formed in the photosensitive taping method may include a substrate film 210, a conductive layer 212, a black layer 230 and a protection film 240, which is similar to that of FIG. 1. A transfer layer 200 including a conductive layer 212 and a black layer 230 may be first formed on a substrate film 210. The conductive layer 212 may include the photosensitive composition including the conductive composite. The transfer film may be finished by stacking a protection film 240 on the transfer layer 200.

To use the transfer film, the protection film 240 may be removed and the transfer film may be oriented and placed on a substrate such that the black layer 230 contacts the substrate. The transfer film may be transferred to form an electrode, yielding an electrode with two layers, i.e., the black layer 230 and the conductive layer 212, similar to that shown in (f) of FIG. 2. Where the black layer 230 and the conductive layer 212 have a pre-printed pattern, they do not need to be exposed and developed. Where they have no pattern, they may be patterned using a photomask.

Figure 4:
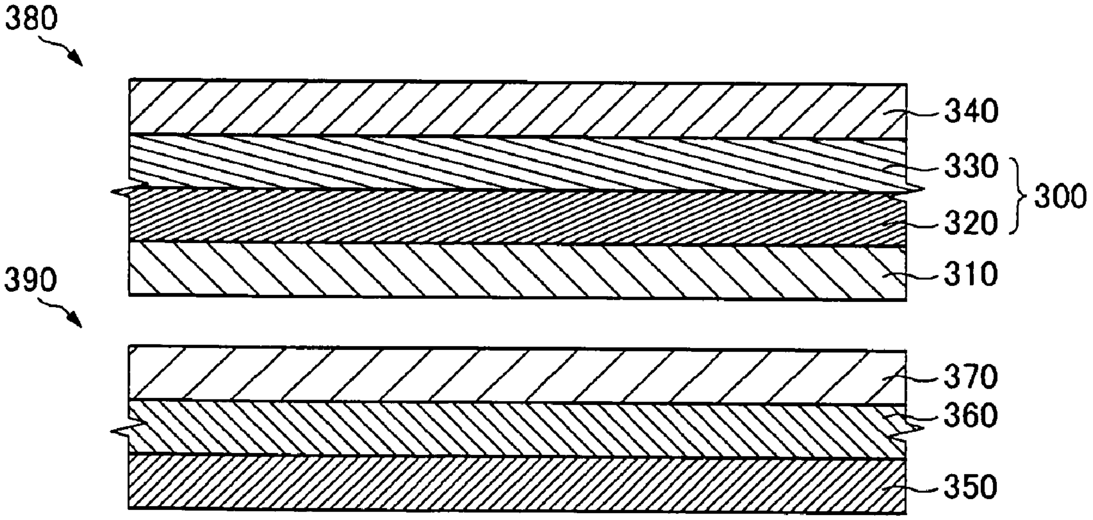
FIG. 4 illustrates a cross-sectional view of an electrode transfer film fabricated in a material transferring method according to an embodiment of the present invention.

FIG. 4 illustrates a cross-sectional view of an electrode transfer film fabricated in a material transferring method according to an embodiment of the present invention. Referring to FIG. 4, the transfer film formed in the material transferring method may include a toner tape 380 and a photosensitive film 390. The toner tape 380 may include a transfer layer 300 including a conductive layer 320 and a black layer 330 disposed, in order, on a substrate film 310 and below a protection film 340. The photosensitive film 390 may include a photosensitive adhesion layer 360 between another substrate film 350 and another protection film 370.

The protection film 340 of the toner tape 380 may be removed, and, thereafter, the black layer 330 may be disposed to face a substrate upon which an electrode is to be formed. The protection film 370 of the photosensitive film 390 may be removed, and then the photosensitive adhesion layer 360 may be disposed to face the substrate film 310 of the toner tape 380 and attached thereto.

The substrate may be transferred and fired as described above in order to form an electrode having two layers, i.e., the black layer 330 and the conductive layer 320, similar to that illustrated in (f) of FIG. 2. Where the photosensitive adhesion layer 360 has a pre-printed pattern, it does not need to be exposed and developed. Where it has no pattern, it may be patterned using a photomask.

The transfer film for forming an electrode can be used to form an address electrode and/or a bus electrode of a PDP. An electrode formed according to an embodiment of the present invention may have a line resistance value of about 30 to about 10,000 Ω/cm. By comparison, a conventional silver electrode may be, e.g., 30 Ω/cm. Therefore, an electrode formed according to an embodiment of the present invention may be used as a substitute for a conventional silver electrode.

Figure 5:
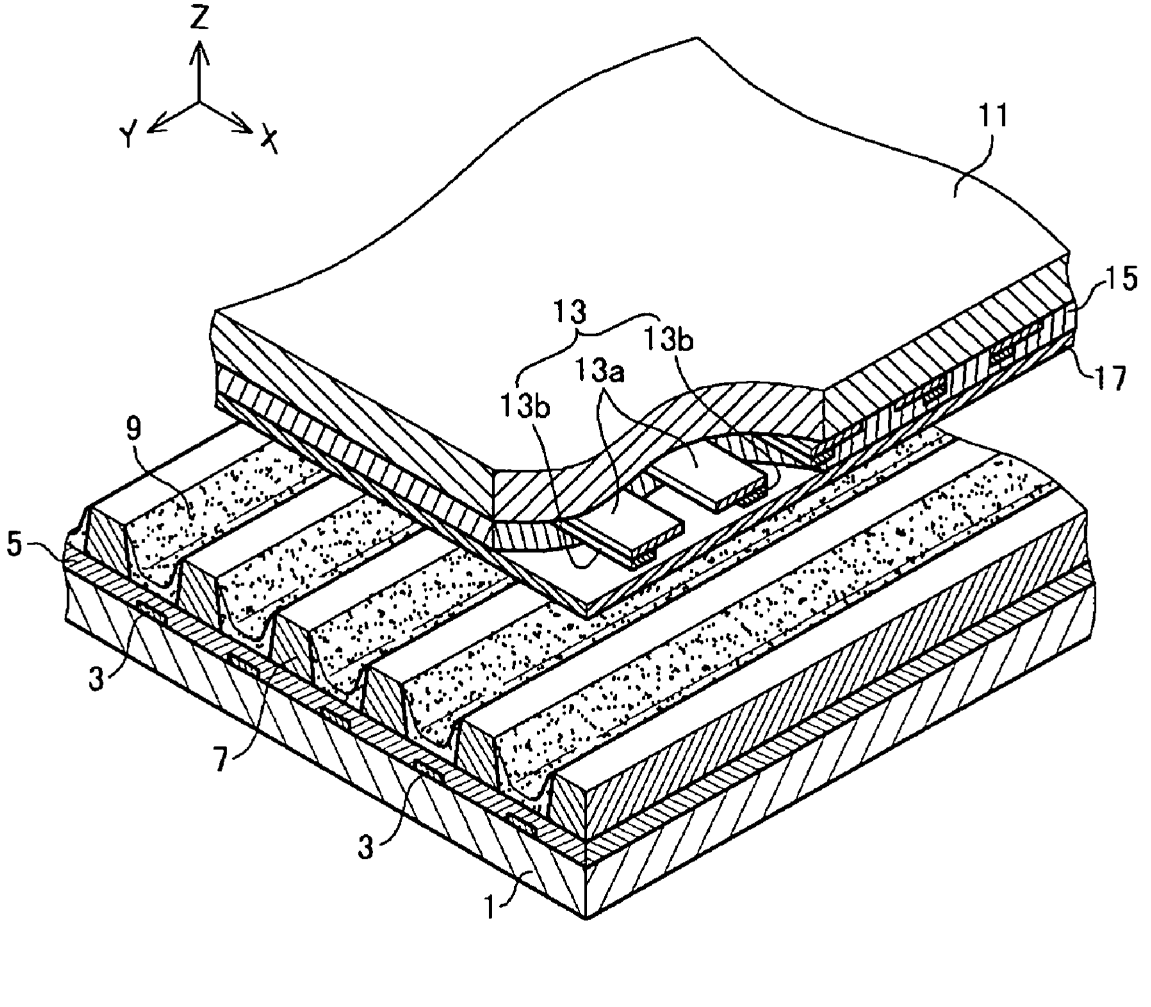
FIG. 5 illustrates a partially exploded perspective view of a plasma display panel according to an embodiment of the present invention.

FIG. 5 illustrates a partially exploded perspective view of a PDP according to an embodiment of the present invention. Referring to FIG. 5, the PDP may include address electrodes 3 formed on a rear substrate 1 in one direction, e.g., the Y direction in FIG. 5. A dielectric layer 5 may be disposed on the surface of the rear substrate 1 and covering the address electrodes 3. Barriers ribs 7 may be disposed on the dielectric layer 5 between each address electrode 3. The barrier ribs 7 may be open or closed as needed. Red (R), green (G) and blue (B) phosphor layers 9 may be disposed between each barrier rib 7.

A front substrate 11 opposing the rear substrate 1 may include display electrodes 13 having a transparent electrode 13*a* and a bus electrode 13*b*. The display electrodes 13 may extend in a direction that crosses the address electrodes 3, e.g., the X direction in FIG. 5. Another dielectric layer 15 and a protection layer 17 may be disposed on the surface of the second substrate 11 and covering the display electrodes 13. Discharge cells may be formed at the crossing points where the display electrodes 13 cross the address electrodes 3.

In operation, address discharges may be generated by applying address voltage signals ($V_a$) across the address electrodes 3 and the display electrodes 13. A sustain voltage signal ($V_s$) may be applied across a pair of display electrodes 13. Vacuum ultraviolet light may be generated by the discharge in order to excite the phosphor layers 9 corresponding to the energized display electrodes 13, thereby emitting visible light through the transparent front substrate 11.

In an implementation, the PDP described above may be fabricated by a) preparing a rear substrate with address electrodes and a dielectric layer formed thereon, b) forming barrier ribs on the entire surface of the dielectric layer on the rear substrate, c) forming red, green and blue phosphor layers inside discharge cells defined by the barrier ribs, d) preparing a front substrate with a display electrode including a transparent electrode and a bus electrode, a dielectric layer and a protection layer formed thereon, and e) assembling, sealing, evacuating, injecting a discharge gas inside, and aging the rear and front panels.

A PDP fabricated according to the present invention may be fabricated using a transfer film that includes the photosensitive composition having the conductive composite formed by coating nickel, carbon and/or copper with a metal having a higher electrical conductivity. The address electrodes 3 of the rear substrate 1 and/or the bus electrodes 13*b* on the front substrate 11 may be formed using the transfer film. The address electrodes 3 and/or the bus electrodes 13*b* may be patterned according to embodiments of the present invention using the sheet method, the photosensitive taping method or the material transferring method described above.

The following examples and comparative examples are provided in order to set forth particular details of one or more embodiments of the present invention. However, it will be understood that the present invention is not limited to the particular details described.

EXAMPLE 1 AND COMPARATIVE EXAMPLE 1

Experimental Example 1

A. Fabrication of a Transfer Film

A photosensitive composition was prepared by mixing the components listed in Table 1, below, and a transfer film was fabricated using the photosensitive composition as follows.

First, a binder, a cross-linking agent, a photoinitiator, an additive and a solvent were poured into a mixer and agitated, and then a conductive material and a frit glass were added thereto and mixed together. Next, the resultant mixture was additionally agitated and dispersed with a three-roll mill, and then filtered and de-foamed to obtain photosensitive compositions for each of a black layer and a conducting layer.

The photosensitive composition for a black layer was coated on a 0.5 μm thick substrate film of polyethyleneterephthalate and dried at 100° C. for 10 minutes to form a 5 μm-thick black layer thereon. Then, the other photosensitive composition for the conductive layer, which includes the conductive composite, was coated on the black layer and dried at 100° C. for 10 minutes to form a 10 μm thick conductive layer thereon.

The transfer film was finished by stacking the same protection film as the substrate film on the conductive layer.

TABLE 1

| Material | | Photosensitive Composition for the Black Layer (weight %) | Photosensitive Composition for the Conductive Layer (weight %) |
|---|---|---|---|
| Copper | | 50 | — |
| Nickel coated with Silver | | — | 50 |
| Glass frit | $PbO—SiO_2—B_2O_3$-based, (average particle diameter: 1.6 μm) | 3.0 | 3.0 |
| Binder | a polymer of (poly(MMA-co-MAA) (molecular weight: 15,000 g/mol) | 10.0 | 10.0 |
| Initiator | 2,2-dimethoxy-2-phenyl-2-phenylacetophenone | 1.0 | 1.0 |
| Cross-linking agent | Pentaerythrytol | 6.0 | 6.0 |
| Solvent | Texanol | 29.5 | 29.5 |
| Additive | Phosphoric acid ether-based | 0.5 | 0.5 |

B. Fabrication of an Electrode

The transfer film prepared in A, above, was used to form an electrode pattern on a substrate as follows. First, a glass substrate was washed and dried, and then the glass substrate was combined with the transfer film, after removing the protection film from the transfer film. Then, they were heat treated at 50° C. for crossing-linking and the transfer film was heated and pressed with a hot roller. The roller was set at a surface temperature of 100° C. and pressed at a speed of 1.0 m/min under a pressure of 50 psi.

Next, the resulting transfer film was exposed to UV light at 450 mJ/cm$^2$ using a photomask with a predetermined pattern and developed by spraying thereon a 0.4 wt % sodium carbonate aqueous solution through a nozzle with a pressure of 1.2 kgf/cm$^2$ for 25 seconds, and then removing the unexposed parts to form the predetermined pattern.

Then, the transfer film with the black and conductive layers was fired at 550° C. for 30 minutes, obtaining a 4 μm thick electrode with the predetermined pattern.

Comparative Example 1

Figure 6A:
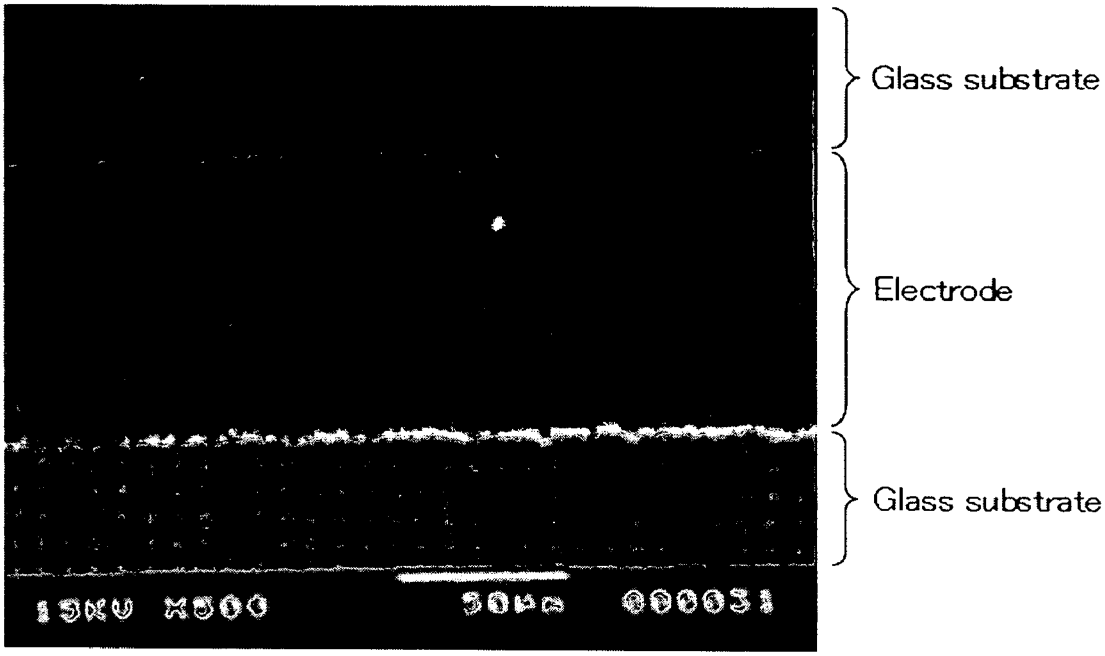
FIG. 6A illustrates a scanning electron microscope (SEM) photograph of a cross section of an exemplary electrode fabricated according to an embodiment of the present invention.
Figure 6B:
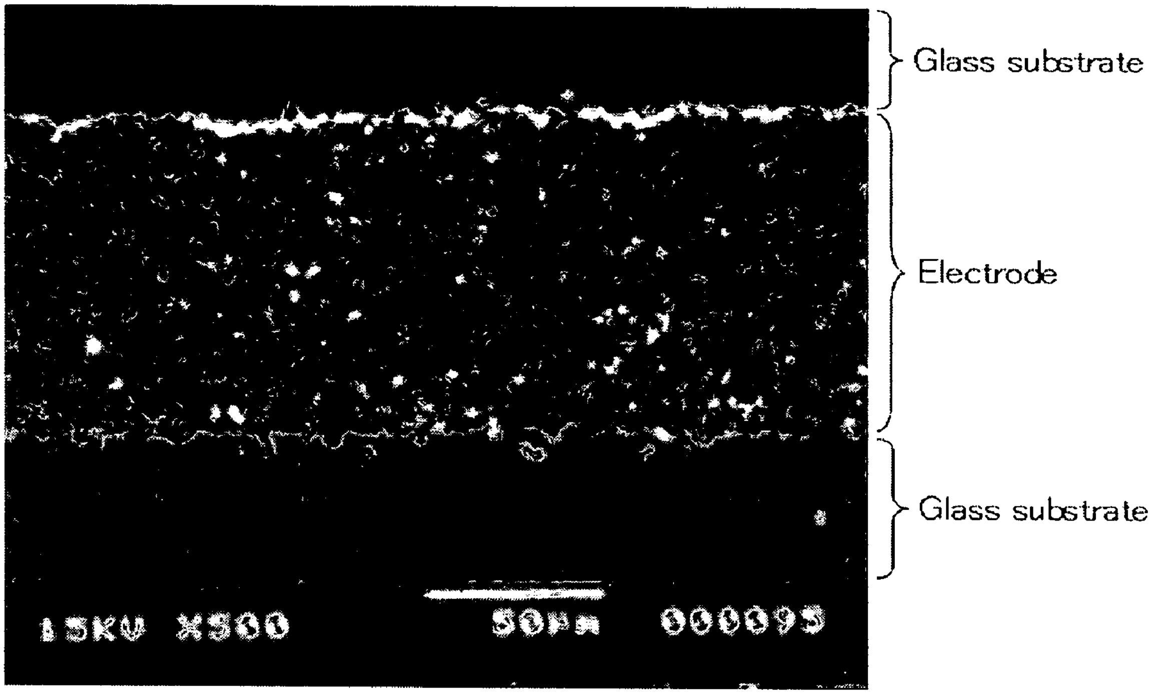
FIG. 6B illustrates a SEM a photograph of a cross section of a comparative electrode.

An electrode layer was formed using a general PDP electrode printing method as follows. First, a pre-cut mask was placed on a substrate and a silver electrode paste having 70 wt % of solid silver was printed with a printer once on the mask. The printed electrode was dried in a drier at 120° C. for 30 minutes and was then exposed to UV light and developed to form a pattern following the pre-cut mask. Then, it was fired at 550° C. for one hour to form the silver electrode layer FIG. 6A illustrates a scanning electron microscope (SEM) photograph of a cross section of an exemplary electrode fabricated according to an embodiment of the present invention and FIG. 6B illustrates a SEM a photograph of a cross section of a comparative electrode. Referring to FIG. 6A, the exemplary electrode formed according to an embodiment of the present invention includes nickel coated with silver and formed in a sheet method. The exemplary electrode is very straight, is not detached, and has no edge-curl or end-curl.

In contrast, referring to 6B, the comparative electrode formed using a general printing method has low straightness, due to the poor interface of the electrode, and has electrode detachment that occurred during the developing and firing.

The exemplary electrode, formed according to an embodiment of the present invention and including the conductive composite, formed by coating nickel, carbon and/or copper with a metal having a higher electrical conductivity, had better electric characteristics than those of the conventional silver electrode. Thus, the conductive composite of the exemplary electrode was shown to be capable of effectively replacing the conventional silver as an electrode material.

The present invention may provide a fine electrode pattern using a transfer film and various transferring methods. The fine electrode pattern may be advantageously used in an address electrode and/or a bus electrode, which may be particularly advantageous as the resolution of PDPs becomes finer and finer.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A composition, comprising:

about 10 to about 20 parts by weight of a binder resin;

about 1 to about 3 parts by weight of a cross-linking agent;

about 0.1 to about 1.5 parts by weight of a photoinitiator;

about 4 to about 30 parts by weight of a solvent; and about 20 to about 80 parts by weight of a conductive composite, based on the weight of the composition, the conductive composite including a first material coated with a metal that has a higher electrical conductivity than the first material, wherein:

the first material is at least one selected from the group consisting of nickel, carbon, and copper, and the metal having a higher electrical conductivity than the first material is at least one selected from the group consisting of aluminum (Al), chromium (Cr), copper (Cu), rhodium (Rh), palladium (Pd), platinum (Pt), gold (Au), a platinum-rhodium alloy (Pt-Rh), and a silver-palladium alloy (Ag-Pd).

2. The composition as claimed in claim 1, wherein the conductive composite is a powder.

3. The composition as claimed in claim 1, wherein the conductive composite has an average diameter in a range of about 0.06 μm to about 20 μm.

4. The composition as claimed in claim 3, wherein the first material has an average diameter in a range of about 0.01 μm to about 10 μm.

5. The composition as claimed in claim 4, wherein the first material has an average diameter in a range of about 0.05 μm to about 5 μm.

6. The composition as claimed in claim 3, wherein the coating on the first material of the metal having a higher electrical conductivity than the first material has a thickness in a range of about 0.05 μm to about 10 μm.

7. A transfer film for forming an electrode, comprising:

a substrate film; and a transfer layer on the substrate film, the transfer layer including at least one conductive layer, wherein:

the conductive layer includes a conductive composite of a first material coated with a metal that has a higher electrical conductivity than the first material, the first material is at least one selected from the group consisting of nickel, carbon, and copper, and the metal having a higher electrical conductivity than the first material is at least one selected from the group consisting of aluminum (Al), chromium (Cr), copper (Cu), rhodium (Rh), palladium (Pd), platinum (Pt), gold (Au), a platinum-rhodium alloy (Pt-Rh), and a silver-palladium alloy (Ag-Pd).

8. The transfer film as claimed in claim 7, further comprising a protective film on the transfer layer, opposite the substrate film.

9. The transfer film as claimed in claim 7, wherein the transfer layer further includes a black layer adjacent to the conductive layer.

10. The transfer film of claim 9, wherein the black layer comprises a black pigment comprising a metal oxide or a composite metal oxide, which comprises at least one metal selected from the group consisting of gold, silver, copper, palladium, platinum, aluminum, nickel, and an alloy thereof, and one or two selected from the group consisting of cobalt, copper, chromium, manganese, and aluminum.

11. A method of forming an electrode, comprising:

providing a transfer film;

transferring the transfer film to a substrate; and firing the transfer film, wherein the transfer film includes:

a substrate film;

a transfer layer on the substrate film, the transfer layer including at least one conductive layer; and a protective film on the transfer layer, wherein:

the at least one conductive layer includes a conductive composite of a first material coated with a metal that has a higher electrical conductivity than the first material, the first material is at least one selected from the group consisting of nickel, carbon, and copper, and the metal having a higher electrical conductivity than the first material is at least one selected from the group consisting of aluminum (Al), chromium (Cr), copper (Cu), rhodium (Rh), palladium (Pd), platinum (Pt), gold (Au), a platinum- rhodium alloy (Pt-Rh), and a silver-palladium alloy (Ag-Pd).

12. The method as claimed in claim 11, wherein the firing is performed at a temperature of about 300° C. to about 600° C.

13. The method as claimed in claim 11, wherein the transferring is performed using a sheet method, a photosensitive taping method, or a material transferring method.

14. A display panel, comprising:

front and rear substrates disposed to face each other; and a first electrode and a second electrode spaced apart from each other and disposed between the front and rear substrates, wherein:

at least one of the first and second electrodes is formed from a composition including:

about 10 to about 20 parts by weight of a binder resin;

about 1 to about 3 parts by weight of a cross-linking agent;

about 0.1 to about 1.5 parts by weight of a photoinitiator;

about 4 to about 30 parts by weight of a solvent; and about 20 to about 80 parts by weight of a conductive composite, based on the weight of the composition, the conductive composite including a first material coated with a metal that has a higher electrical conductivity than the first material, and the first material is at least one selected from the group consisting of nickel, carbon, and copper, and the metal having a higher electrical conductivity than the first material is at least one selected from the group consisting of aluminum (Al), chromium (Cr), copper (Cu), rhodium (Rh), palladium (Pd), platinum (Pt), gold (Au), a platinum-rhodium alloy (Pt—Rh), and a silver-palladium alloy (Ag—Pd).

15. The display panel as claimed in claim 14, wherein the at least one of the first and second electrodes includes a transparent electrode and a bus electrode, and the bus electrode is formed from the conductive composite.

* * * * *